United States Patent Office 3,318,684
Patented May 9, 1967

3,318,684
METHOD FOR PRODUCING SPHEROIDAL
ALUMINUM PARTICLES
Donald C. Gernes, Los Gatos, and William R. King, Jr., Los Altos, Calif., assignors to Kaiser Aluminum & Chemical Corporation, Oakland, Calif., a corporation of Delaware
No Drawing. Filed Nov. 2, 1964, Ser. No. 408,410
8 Claims. (Cl. 75—.5)

This invention relates to a method for producing small spheroidal aluminum particles. More particularly, this invention relates to a method for producing uniform sized spheroidal particles of aluminum in sizes as small as 5 microns.

For many purposes small particles of aluminum are useful. Small particles, that is those in the range of 2000 microns or less, are frequently used in powder metallurgy. In the field of powder metallurgy, the small particles are placed in a mold and compressed to substantially the density of aluminum metal with the resultant formation of solid parts having shapes otherwise not obtainable and having useful properties that are not obtainable through casting. Aluminum powder is also useful in chemical processes in which its high surface area and particulate form make it reactive and easily distributed. Aluminum powder is also useful as a component of solid fuels for such devices as rockets, and for such use it must be easily metered and distributed as well as highly reactive.

In all of the above-mentioned uses and in many others the aluminum powder is desirably as fluid-like as possible. It should flow readily and be non-agglomerating. It is also desirable that the individual particles of powder be as uniform in size as possible so that each particle exerts the same effect. For example, in powder metallurgy easy flowing powder can be easily handled and it will flow to fill all portions of the mold. The uniform size of the particle will also cause uniform compaction and therefore a product having the same density throughout. Easy flowing powder in a chemical process prevents bridging and spurting in feeding devices thereby providing a steady flow rate of the powder while uniform size particles produce uniform distribution and reaction rates.

The process of this invention provides a method for producing aluminum powder in the form of small particles that are substantially perfect spheres or spheroids. This process is also useful to produce a product in which all of the spheroids are approximately the same size. The dry product from this process flows like a fluid, is non-agglomerating and has high surface area.

The process of this invention comprises preparing a two-phase liquid system of molten aluminum and a second liquid which is compatible with the molten aluminum. The two-phase liquid system is agitated with sufficient energy to cause the aluminum phase to disperse in the second liquid, and in this regard, the second liquid must be present in sufficient quantity so that the aluminum phase becomes the discontinuous phase. During the formation of the dispersed system, hereinafter called a dispersion, the two-phase system is in contact with a stabilizing material which prevents the aluminum particles that are formed during agitation from coalescing even when they all settle to the bottom of the container after agitation stops. The stabilizing material of the present invention, although unknown, is provided by having the two-phase liquid system in contact with either nitrogen or carbon, and hydrogen or a substance that will produce hydrogen within the system. The stabilizing materials specified herein might not be the actual stabilizers, but might be precursers to stabilizers. However, since the addition of hydrogen, and either nitrogen or carbon causes stabilization of the dispersion, these materials will be referred to as stabilizers with the above-noted qualifications in mind. During formation of the dispersion it is necessary to exclude oxygen from the system because its presence destroys the stability of the dispersion.

In another embodiment the system described above may also be in contact with aluminum chloride. Aluminum chloride in the two-phase system has been found to retard coalescence of the aluminum spheres to a greater degree. Aluminum chloride also causes the powdered aluminum product to have a clean and shiny appearance.

In the context of this application the term aluminum shall mean aluminum and alloys that are predominantly aluminum. The term carbon shall means any form of carbon such as amorphous carbon or graphite and particularly graphite which may be formed into such structural members as containers or impellers. The hydrogen employed in the present process may be hydrogen per se, or it may be hydrogen formed in situ by the presence of other substances. For example, hydrogen chloride or chlorine gas may be employed in contact with the two-phase liquid system because, under the conditions of the reaction, both will provide hydrogen in the system by ionizing, decomposing, hydrolyizing or otherwise reacting with aluminum, trace amounts of water and/or other material in the system. It has been found that only trace quantities of hydrogen are necessary in order to provide an inhibitor to prevent coalescence of aluminum successfully.

The second liquid in the two-phase liquid system is one that is compatible with molten aluminum, that is one which has no adverse effect on the aluminum and one which is not adversely affected by the aluminum. Molten salts, particularly molten salt mixtures which are blended to provide a second liquid with the proper melting point and fluidity are useful. Mixture containing various combinations of sodium chloride, potassium chloride, and lithium chloride, which melt in the right temperature range, preferably from about 700 to 850° C., are particularly useful because they are not too volatile at the melting point of aluminum, they are insoluble in aluminum, they are stable, not poisonous, non-explosive, non-combustible, etc.

The process of the present invention is completed by reducing the temperature of the dispersed, two-phase system until the molten aluminum particles solidify, after which the resultant aluminum spheroids may be separated by conventional means such as screening from the molten second liquid or dissolving the frozen second liquid in water or other solvents to leave a residue of spheroidal aluminum particles.

The process of this invention is effected either in batches or continuously by subjecting the two-phase system to stirring or agitation. The size of the aluminum spheroids produced by the process is regulated by the energy employed in stirring, and the use of high energy input and good stirring practices produces smaller particles. Stirring or agitation is usually effected with a high speed impeller which may be used in conjunction with radial baffles or other configurations in the container to increase the efficiency with which the energy added to the system by the impeller is used. For any given stirring method and energy level employed, spheroids of a particular size will be produced, and it has been found that in the process of the present invention the product is relatively uniform in size regardless of what size particle is produced. Spheroids as small as 5 microns in diameter have been produced and spheroids substantially entirely in the range of 5–10 microns can be produced by this method.

Following are examples reporting the results of work embodying the process of the present invention. All of the work reported in the Examples 1 through 13 was carried out in the same manner in order for the results to be comparative. In all cases a crucible was provided which was made either of alumina, when no carbon was desired in the system, or of graphite, when carbon was desired in the system. The crucibles were fitted into an outer shell and provided with a stirrer which was made either of alumina or graphite. Granular salt mixtures of sodium chloride and potassium chloride, or sodium chloride, potassium chloride and lithium chloride were introduced into the crucible usually in a quantity of about 20 grams. The apparatus was then assembled and tubes for introducing gas and other ingredients were connected. The apparatus was placed in an electric crucible furnace and heated to a temperature of 750° C. which produced a molten and fluid salt bath since the melting point of the salt mixtures was usually about 650° C. After the salt was melted either argon gas or nitrogen gas, depending upon whether nitrogen was desired in the system, was introduced beneath the molten salt surface and the molten salt was flushed of other dissolved gases.

Molten salt mixtures such as those described above ordinarily contain small amounts of water which are sufficient to produce hydrogen in the presence of such gases as chlorine. In those runs where a water-free system was desired, chlorine gas was passed through the molten salt system for 10 minutes after which excess chlorine was removed by flushing or purging with nitrogen or argon. After purging the salts, about 10 grams of 99.99% aluminum metal was introduced. If it was desired to have aluminum chloride in the melt, after the aluminum was melted, chlorine gas was bubbled through the molten aluminum at a rate of 22 ml. per minute for a period of about 10 minutes. Employing this much chlorine produced about 3% aluminum chloride in the salt, and after the chlorine flow was stopped excess chlorine was flushed out with additional nitrogen or argon bubbling through for 30 minutes. To avoid interference with other variables, in some cases carbon was added to the system as powdered graphite and $AlCl_3$ was added by being formed elsewhere and fed in with the flushing gas stream. These exceptions are noted in the examples.

When all ingredients were added, the stirrer was operated at about 2100 r.p.m. while purging with nitrogen or argon continued. After 10 minutes of stirring at 2100 r.p.m. with all of the desired ingredients present the stirring was stopped and the apparatus was cooled under continuous flow of argon or nitrogen until it solidified and was cool enough to handle. At that point the solid two-phase system was removed from the crucible, and the salt was dissolved in hot water leaving a solid residue of aluminum.

In the table that follows, systems reported as being free of carbon were those in which the process was carried out in an alumina crucible with an alumina stirrer. Systems reported as being free of nitrogen were those carried out in a system that was purged entirely with argon gas and was out of contact at all times with nitrogen. Systems reported as being free of hydrogen were those systems in which the salt mixtures were first treated with chlorine to remove all traces of water and were subsequently never contacted with water, hydrogen, or hydrogen chloride. Systems reported as being free of aluminum chloride were those systems in which all chlorine was removed from the system prior to introducing aluminum, and after aluminum was introduced no additional chlorine was added to the system.

The results are indicated as stable or unstable systems. Stable systems were manifested by the production of individual spheres separate and distinct from each other with very small quantities of chain spheres. Unstable systems were manifested by a product that was either one solid piece of aluminum or aluminum in the form of agglomerates of spheres or aluminum consisting of large quantities of chain spheres. Generally speaking, a system that produced all individual spheres except for approximately 10% chain spheres were considered stable systems. The chains in the stable systems were mostly twins. Although the evaluation was somewhat subjective there was no difficulty in distinguishing stable systems from unstable systems. The following table reports the results of processes embodying this invention.

| Example No. | Carbon | Nitrogen | Hydrogen | $AlCl_3$ | Result |
|---|---|---|---|---|---|
| 1 | None | None | None | None | Unstable. |
| 2 | Graphite powder in $Al_2O_3$ crucible. | do | do | do | Do. |
| 3 | None | Nitrogen atmosphere in crucible. | do | do | Do. |
| 4 | do | None | Hydrogen chloride | do | Do. |
| 5 | do | do | None | $Cl_2$ bubbled through Al before stirring. | Do. |
| 6 | Graphite powder in $Al_2O_3$ crucible. | do | Hydrogen chloride | None | Stable. |
| 7 | Graphite crucible | do | Hydrogen gas | do | Do. |
| 8 | None | Nitrogen atmosphere | Hydrogen chloride | do | Do. |
| 9 | do | do | Hydrogen | do | Do. |
| 10 | do | None | Hydrogen chloride | HCl bubbled through Al before stirring. | Unstable. |
| 11 | Graphite crucible | do | None | $AlCl_3$ introduced in argon flush stream. | Do. |
| 12 | None | Nitrogen atmosphere | do | $AlCl_3$ introduced in $N_2$ flush. | Do. |
| 13 | Graphite crucible | do | Hydrogen | $Cl_2$ bubbled through molten Al. | Completely stable with shiny appearance. |

It may be noted from the examples tabulated above that stable dispersions which produce spheroidal aluminum are formed only in those instances where hydrogen is present in the two-phase liquid system along with either carbon or nitrogen. It may also be noted that when aluminum chloride is present in the system that includes hydrogen and either carbon or nitrogen, there is a complete separation of substantially all spheroidal particles from all other spheroidal particles indicating that a more stable dispersion was formed, and the product was clean and shiny in appearance. In all of the systems that lack either of the essential elements, that is in systems that lack either hydrogen or one of carbon and nitrogen, an unstable emulsion was formed which was manifested by the aluminum droplets coalescing into masses rather than remaining as individual and distinct spheroids. The stable systems reported in the table produced spheroids between 20 microns and 500 microns in diameter. In the specific instance of Example 13 the spheroids produced were between 20 and 50 microns and they were made by agitating the two-phase system at 2100 r.p.m. for 20 minutes before cooling it to the temperature at which the entire system became solid. Increasing the agitation energy by such means as baffling the interior of the crucible or operating the impeller at higher speed may be employed to produce aluminum spheroids as small as 5 microns.

*Example 14*

Example 14 illustrates a presently preferred mode of operating the invention in order successfully to obtain high yields of high quality aluminum spheres. A baffled, graphite vessel was fitted with a cover, a high speed stirrer, and means for introducing ingredients into and removing products from the vessel. The vessel was covered to protect it from the atmosphere, flushed with nitrogen and heated to about 800° C. A total of about 2400 grams of an equimolar mixture of potassium chloride and sodium chloride was then added gradually with continued heating until a homogeneous molten salt phase was obtained. Before the salts were charged to the vessel they were dried at 110° C.

After the salt was melted, 1200 grams of degreased, electrical conductor-grade aluminum (99.99% aluminum) were added slowly to the vessel. When the aluminum was all melted the temperature of the vessel was reduced to about 750° C. and the stirrer was operated at about 800 r.p.m. to initiate dispersing the metal into the salt phase. Chlorine gas was then introduced at a rate of about 1.2 liters per minute for a period of 5 minutes after which the vessel was again flushed with nitrogen and the stirrer speed was increased gradually to 2800 r.p.m. After 5 minutes of stirring at 2800 r.p.m. the stirrer was stopped, the two-phase system was discharged from the vessel and cooled until the entire system solidified. The aluminum spheres resulting from the process were recovered by dissolving the salt in water and then washing and drying residual solid material.

Substantially the entire aluminum charge was recovered as individual, separate spheroids which were found to be 99% by weight smaller than 74 microns and 50% by weight smaller than 43 microns in diameter. Analysis of the dissolved salt indicated that it contained several percent by weight of aluminum chloride.

Although the reaction mechanism is not known, it is postulated that the presence of hydrogen in the two-phase system activates the aluminum so that it reacts with carbon or nitrogen to form a thin layer of aluminum carbide or aluminum nitride around the outside surface of the molten aluminum spheroids that are formed by stirring. The aluminum carbide or aluminum nitride coatings on the spheroids shields the molten aluminum in the droplets from coming in contact and coalescing with the metal in other droplets thereby forming the stable dispersion. Although it is thought that the carbon and nitrogen actually react and that their reaction products produce the stabilizing effect that is observed, it has also been noted that very small quantities of carbon and nitrogen, in fact trace quantities are all that is required to perform this function. Similarly, only trace quantities of hydrogen are necessary to perform its function. For example, only the amount of nitrogen absorbed in the molten salt mixture from a blanketing atmosphere of nitrogen is entirely sufficient for the process of this invention, and as indicated by the examples, only the amount of carbon that dissolves from the walls of a graphite crucible is sufficient to produce the desired effect. It has also been noted that the amount of water introduced into the system with the dry salts and remaining there even at temperatures of 800° C. forms sufficient hydrogen to effect the process when chlorine gas is hydrolized by bubbling through the salt. Quantitative analyses of the concentrations of carbon, nitrogen, and hydrogen are impossible at the reaction conditions because of the temperature and isolated nature of the reactants. However, since the system obtains enough stabilizer by dissolving the various ingredients, mere contact between the molten two-phase system and the various inhibiting ingredients will provide enough of the essential materials.

As noted above, the presence of oxygen during formation of the dispersion has an adverse effect in that it diminishes or destroys the stability of the system. The reason for this adverse effect is not known, but the effect can be easily avoided by employing reasonable shielding from the atmosphere and conventional purging techniques when the system is being agitated to form a dispersion.

Having thus described the invention, what is claimed is:

1. The method for making spheroidal aluminum particles comprising agitating a two-phase liquid system containing a first phase of molten aluminum and a second phase of a liquid compatible with molten aluminum under conditions to produce a dispersion of aluminum in said second liquid, maintaining said dispersion out of contact with oxygen, effecting agitation while said system is in contact with hydrogen and a stabilizing material selected from a group consisting of carbon and nitrogen, cooling the system to solidify aluminum and recovering the resultant spheroidal aluminum particles.

2. The method for making spheroidal aluminum particles comprising agitating a two-phase liquid system containing a first phase of molten aluminum and a second phase of liquid compatible with molten aluminum under conditions to produce a dispersion of aluminum in said second liquid, maintaining said dispersion out of contact with oxygen, effecting agitation while said system is in contact with hydrogen, aluminum chloride, and a stabilizing material selected from the group consisting of carbon and nitrogen, cooling the system to solidify aluminum and recovering the resultant spheroidal aluminum particles.

3. Claim 1 wherein said second liquid is molten salt.

4. Claim 1 wherein said second liquid is a mixture of sodium chloride and potassium chloride.

5. Claim 1 wherein said second phase is a mixture of sodium chloride, potassium chloride and lithium chloride.

6. Claim 1 wherein hydrogen is produced in situ by contacting said two-phase system with hydrogen chloride.

7. Claim 1 wherein hydrogen is produced in situ by contacting said two-phase system with chlorine.

8. Claim 1 wherein said system is maintained between about 700° C. and 850° C. during agitation.

No references cited.

DAVID L. RECK, *Primary Examiner.*

W. W. STALLARD, *Assistant Examiner.*